United States Patent Office

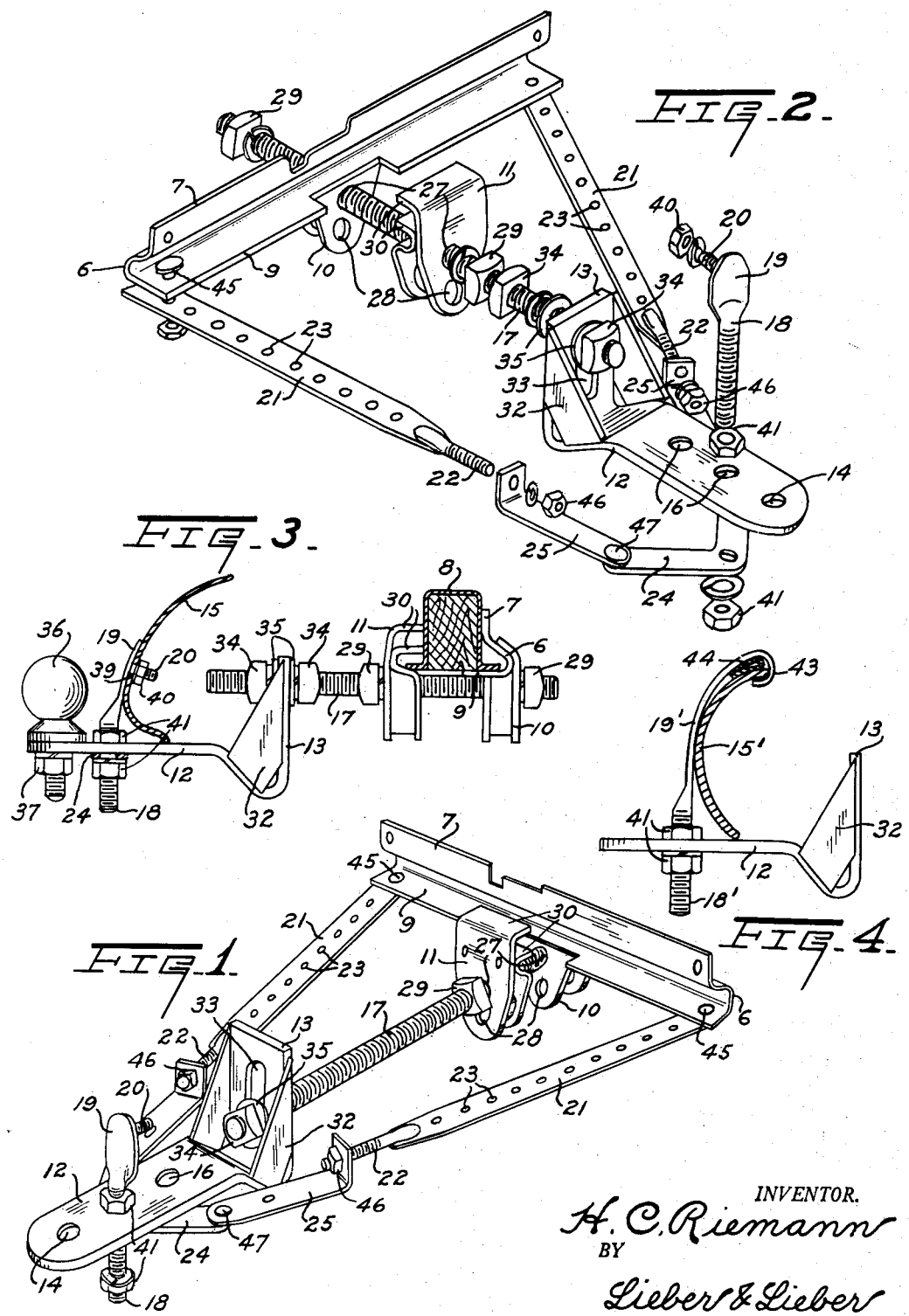

2,719,733
Patented Oct. 4, 1955

---

2,719,733

BUMPER TO FRAME HITCH FOR AUTOMOBILES

Howard C. Riemann, West Allis, Wis., assignor to The Fulton Company, West Allis, Wis., a corporation of Wisconsin Application January 30, 1953, Serial No. 334,295

4 Claims. (Cl. 280—501)

The present invention relates generally to improvements in vehicle towing appliances, and relates more specifically to improvements in the construction and operation of a bumper to frame hitch which is applicable as an accessory to various types of automobiles.

The primary object of this invention is to provide an improved hitch for connecting the towing coupling uniting two vehicles to one of them, in a manner whereby the draft is most effectively transmitted to the latter.

When attaching trailer couplings to automobiles provided with bumper bars spaced from the frames of the vehicles, it has heretofore been common practice to attach one of the coupling members either to one of the bumpers alone, or to both a bumper bar and to the adjacent cross-beam of the automobile frame. Since all bumper bars are preferably rather flexible and are also mounted upon the vehicle bodies instead of the main frame, the direct attachment of the coupling member to the bumper alone is not satisfactory and is also relatively dangerous. While various types of hitches for effecting draft connections between the coupling members and both the bumper and frame of a vehicle, have heretofore been proposed and used with variable degrees of success, these prior devices are either too complicated and difficult to install, or they are not sufficiently strong and durable, or they cannot be conveniently and effectively applied to all of the various standard types of automobiles on the market.

It is therefore an important object of my present invention to provide an improved bumper to frame hitch which is simple and durable in construction and which is also universally applicable to and cooperable with any of the standard cars having spaced transverse bumper bars and substantially parallel adjacent frame beams.

Another important object of this invention is to provide a readily adjustable and installable towing appliance for positively transmitting the pulling force from both the frame and the bumper to one of the members or elements of a universal trailer coupling.

A further important object of the invention is to provide a safety hitch for most effectively transmitting the towing pull from a trailer to a draft vehicle, and especially to an ordinary automobile having a transverse rear bumper mounted upon the vehicle body and spaced from the main frame.

Still another important object of the present invention is to provide an improved universal bumper to frame hitch for automobiles which is of sturdy construction and can be conveniently applied to diverse types of automotive vehicles by a novice and without marring the automobiles.

An additional important object of my invention is to provide an exceptionally strong but compact automobile trailer coupling hitch which may be easily adjusted to meet varying operating conditions, and which directly transmits the pull from the coupling to both the bumper and frame of the draft vehicle.

These and other more specific objects and advantages of the invention will be apparent from the following detailed description from which it will be apparent that the gist of the improvement is the provision of a universally adjustable and applicable bumper to frame hitch which may be readily applied to or removed from various types of standard automobiles, so as to directly transmit the pulling force of the draft vehicle frame to the trailer through a sturdy main rod which is definitely positioned and stabilized by means of diverging links also connecting the trailer coupling directly to the main frame on opposite sides of and remote from the main draft rod, whereby the trailing vehicle is most effectively guided and safely transported.

A clear conception of the features constituting my present improvement, and of the construction and functioning of a typical bumper to frame hitch embodying the same, may be had by referring to the drawing accompanying and forming a part of this specification wherein like reference characters designate the same or similar parts in the various views.

Fig. 1 is a top and rear perspective view of a commercial bumper to frame automobile hitch assemblage with the trailer ball member omitted, but showing the unit otherwise completely assembled and ready for use;

Fig. 2 is a similarly perspective exploded view of the same hitch unit, more clearly illustrating the mode of assembling it and of fastening the various parts;

Fig. 3 is a transverse section through a typical automobile bumper bar and adjacent transverse frame beam, showing the manner in which the central draft beam, bumper fixture, and frame clamp cooperate with the sectioned vehicle parts, but having the stabilizer parts omitted; and Fig. 4 is a transverse section through another type of bumper bar, showing a modified fixture for attaching the main bracket of the hitch to the bumper.

While the invention has been shown and described herein as being advantageously applicable to various types and styles of standard automobiles embodying transverse body supported bumpers spaced from the main vehicle frame structures, it is not the intent to unnecessarily restrict the utility of the improved features by virtue of this limited embodiment; and it is also contemplated that specific descriptive terms employed herein be given the broadest interpretation consistent with the disclosure.

Referring to the drawing, the typical commercial bumper to frame hitch shown therein, comprises in general, an elongated front cross-beam 6 having an upright flange 7 cooperable with the inner side of a transverse vehicle frame beam 8, and also having a horizontal flange 9 disposable directly beneath the frame beam 8; front and rear clamps 10, 11 cooperable respectively with the front face of the cross-beam 6 and with the rear face of the frame beam 8; an elongated bracket 12 having a sturdy flange 13 at its forward end spaced from the clamps 10, 11 while its rear horizontal end portion is provided with an opening 14 and its medial portion is formed to coact with the lower edge of a transverse bumper bar 15 and has several spaced holes 16 therethrough; an elongated substantially horizontal screwthreaded draft rod 17 adjustably interconnecting the bracket flange 13 with the clamps 10, 11; a fitting 18 attachable to the rear bracket 12 at one of the holes 16 and having an upper flexible portion 19 provided with a forwardly projecting integral stud 20; a pair of elongated forwardly diverging links 21 secured at their front ends to the extreme ends of the cross-beam 6 while their opposite ends are provided with threaded extensions 22 and their medial portions have apertures 23 therein; and an angular lever 24 having its medial portion secured to the bracket 12 by the fitting 18 while its opposite ends are adjustably and pivotally attached to the link extensions 22 by connectors 25.

The front elongated transverse cross-beam 6 of the unit is preferably formed of heavy sheet metal, and the flanges 7, 9 are integrally united by a recessed section formed to clear the lower front flanges of the main frame beam 8, as shown in Fig. 3. The two flanges 7, 9 are also cut out at local zones so as to avoid interfering with structure associated with the transverse frame beams 8 of certain types of automobiles, and the inverted U-shaped frame beams 8 are ordinarily filled with wood as illustrated. The front and rear clamps 10, 11 are also formed of durable sheet metal, and are provided with upper and lower alined openings 27, 28 adapted to interchangeably receive the main draft rod 17, this construction also facilitating application of the hitch to different types of cars. These clamps 10, 11 are adapted to be shifted along the rod 17 by means of nuts 29, and the front clamp 10 has an upper lip cooperable with the front face of the cross-beam 6 while the rear clamp 11 has two spaced flanges 30 adapted to clampingly engage the rear face of the beam 8 so as to clear the lower rear flange of the beam 8 as depicted in Fig. 3.

The elongated bracket 12 is also formed of heavy and durable sheet metal, and has its front flange 13 reinforced by opposite side braces 32, and this flange is provided with a vertical central slot 33, as shown in Figs. 1 and 2. This slot 33 permits the main pull rod 17 to be disposed in alinement with either the upper openings 27 or with the lower openings 28 of the clamps 10, 11 in order to enable the unit to be applied to various styles of vehicles; and the rod 17 is adapted to be clamped to the bracket flange 13 in various positions of adjustment by means of nuts 34 coacting with washers 35. The rear opening 14 of the bracket 12 is adapted to receive one member such as a ball 36 of a universal trailer coupling, as illustrated in Fig. 3, and which member may be firmly but detachably clamped to the bracket 12 by a nut 37; and the holes 16 located in the medial portion of the bracket 12 are formed to snugly receive the lower threaded shank of the fitting 18.

The elongated draft rod 17 is of heavy construction and is screw-threaded throughout its entire length so as to permit disposition and adjustment of the nuts 29, 34 to various locations therealong, and the fitting for clamping the bumper bar of the automobile may be either of several interchangeable types depending upon the specific style of bumper with which the unit is to cooperate. Most standard bumper bars 15 have a central hole 39 therein as shown in Fig. 3, and when the improved unit is applied to this type of bumper bar 15, a fitting such as illustrated in Figs. 1, 2 and 3 may be utilized to clamp the bracket 12 to the bumper. In such cases, the threaded shank of the fitting may be inserted within one of the holes 16 of the bracket 18, while the upper flexible fitting portion may be bent to conform with the outer bumper surface, and the stud 20 can then be passed through the hole 39. A clamping nut 40 may thereafter be applied to the stud 20, and clamping nuts 41 may likewise be applied to the threaded bracket shank to firmly clamp the bumper bar 15 to the bracket 12 with the lower edge of the bumper in contact with the top of the bracket as in Fig. 3.

However, if the bumper is not provided with a central hole 39 and the owner of the vehicle does not desire to provide such a hole, then a modified fitting 18' such as shown in Fig. 4 may be utilized to clamp the bracket 12 to the bumper bar 15'. In such cases, the upper flexible portion 19' of the fitting 18' is provided with a hook 43 adapted to engage the upper edge of the bumper bar 15'. A protective pad 44 of rubber or felt, may be inserted between the fitting portion 19' and the bumper bar 15' in order to prevent marring of the bumper surface, and when clamping nuts 41 are applied to the threaded shank of the fitting 18' after it has been inserted through one of the holes 16, these nuts 41 may be adjusted to firmly clamp the bumper bar 15' to the top of the bracket 12 as illustrated in Fig. 4.

The elongated stabilizing links 21 may be formed of flat metal stock, and the apertures 23 therein are spaced uniform distances somewhat less than the lengths of the threaded extensions 22 at the rear extremities of the links 21. The forward ends of the links 21 are attached to the outermost extremities of the cross-beam 6 by bolts 45, while the rear extensions 22 are adapted to be fastened to upright flanges at the front ends of the connectors 25 by means of nuts 46, as shown in Figs. 1 and 2. The angle lever 24 and the connectors may also be formed of flat metal stock, and the medial portion of the lever 24 is provided with an opening through which the shank of the fitting 18 may be inserted, while the opposite ends of this angle lever are attached to the rear ends of the connectors 25 by pivot bolts 47. This stabilizing assemblage is such that when the rearwardly converging links 21 and connectors 25 have been attached to the beam 6 and angle lever 24 respectively, the nuts 46 may be manipulated to place the linkage under tension, and the spacing of the apertures 23 and the length of the threaded extensions 22 and of the rod 17, is such that the unit may be properly applied to vehicles having different spacing between the bumper bar 15 and frame beam 8.

When the improved hitch has been properly constructed as hereinabove described, it may be applied to any of the standard automobiles having a body mounted bumper spaced from a transverse beam, to firmly and directly connect a trailer coupling to both of these vehicle elements and to thereby transmit the draft pull to the automobile in a most effective manner. In order to install the hitch unit on a car, it is only necessary to firmly attach the cross-beam 6 to the frame beam 8 with the aid of the clamps 10, 11, threaded rod 17, and clamping nuts 29 after the bolts 45 have been applied to the cross-beam 6 and to the proper apertures 23 in the links 21. The bracket 12 may then be provided with a suitable fitting 18, 18' which should be properly applied to the bumper bar 15, 15' as previously described, whereupon the front flange 13 of the bracket 12 may also be clamped to the threaded rod 17. The rear extensions 22 of the links 21 may thereafter be attached to the connectors 25 with the aid of the nuts 46, thereby stabilizing the pull rod 17 and completing the installation.

All of the connecting bolts and clamping nuts should be provided with suitable lock washers as shown, and the provision of the slot 33 in the bracket flange 13, and of the dual openings 28 in the clamps 10, 11 permits the rod 17 to be disposed at different elevations so as to clear automobile parts which might otherwise interfere with the hitch. The provision of a long draft rod 17 threaded throughout its entire length, and of the series of apertures 23 in the links 21, as well as the provision of several holes 16 in the bracket 12, obviously enables the unit to be readily applied to various types of vehicles. The various special parts of the assemblage may be sturdily constructed of sheet metal with the aid of punches and dies, and standard bolts, clamping nuts and lock washers may be utilized throughout, thereby minimizing the cost of manufacture, and allowing lost or broken parts to be easily replaced. The improvement has gone into highly satisfactory and successful commercial use and is flexible in its adaptations and readily installable by a novice.

It should be understood that it is not desired to limit this invention to the exact details of construction and to the precise mode of installation of the trailer hitch herein specifically shown and described, for various modifications within the scope of the appended claims may occur to persons skilled in the art.

I claim:

1. In a bumper to frame hitch for automobiles, an elongated cross-beam cooperable with the inner face of one of the transverse vehicle end frame beams, a clamp cooperable with the outer face of the same frame beam, another clamp coacting with a surface of said cross-beam, a bracket spaced from said clamps and having its end nearest to said clamps provided with a flange and its opposite end formed for attachment to a trailer coupling member, an elongated draft rod adjustably interconnecting said frame flange and said clamps, a fitting formed to firmly clamp said bracket to the adjacent vehicle bumper, a lever having its medial portion pivotally mounted upon said fitting, and a pair of longitudinally adjustable relatively diverging stabilizer links pivotally connecting the opposite ends of said lever with the corresponding opposite ends of said cross-beam.

2. In a bumper to frame hitch for automobiles, an elongated cross-beam cooperable with the inner face of one of the transverse vehicle frame beams, a clamp cooperable with the outer face of the frame beam, a bracket spaced from said clamp and having its end remote from the clamp formed for attachment to a trailer coupling member, a draft rod screw threaded throughout its length, nuts coacting with said threads and with opposed surfaces of said bracket for adjustably connecting the opposite end of said bracket with said clamp and said cross-beam through the rod, a fitting formed to firmly clamp said bracket against the adjacent vehicle bumper, a lever having its medial portion pivotally attached to said bracket, and a longitudinally adjustable stabilizer link pivotally attached to each end of said lever and to the corresponding end of said cross-beam.

3. In a bumper to frame hitch for automobiles, an elongated cross-beam cooperable with the inner face of one of the transverse vehicle end frame beams, a clamp cooperable with the outer face of the same frame beam, another clamp coacting with a surface of said cross-beam, a bracket spaced from said clamps and having its end nearest to said clamps provided with a flange and its opposite end formed for attachment to a trailer coupling member, an elongated draft rod screw threaded throughout its length, nuts coacting with said threads and with opposed surfaces of the flange for adjustably interconnecting said bracket flange and said clamps through the rod, a fitting formed to firmly clamp said bracket to the adjacent vehicle bumper, a lever having its medial portion pivotally attached to said bracket, and a longitudinally adjustable stabilizer link pivotally attached to each end of said lever and to the corresponding end of said cross-beam.

4. In a bumper to frame hitch for automobiles, a cross-beam coacting with the inner face of one of the transverse vehicle frame beams, a clamp coacting with the outer face of the frame beam, a bracket spaced from said clamp and having its end portion remote from said clamp formed for attachment to the adjacent vehicle bumper and to a trailer coupling member, a screw threaded draft rod interposed between said bracket and said cross-beam, nuts coacting with the screw threads of said draft rod and with opposed surfaces of said bracket, a lever having its medial portion pivotally attached to said bracket, and a longitudinally adjustable stabilizer link pivotally attached to each end of said lever and to the corresponding end of said cross-beam.

References Cited in the file of this patent

UNITED STATES PATENTS

| Number | Name | Date |
|---|---|---|
| 752,156 | Hacker | Feb. 16, 1904 |
| 1,436,595 | McKay | Nov. 21, 1922 |
| 1,550,502 | Chamberlain | Aug. 18, 1925 |
| 2,097,006 | Weis | Oct. 26, 1937 |
| 2,175,427 | Carmody et al. | Oct. 10, 1939 |
| 2,471,184 | Andrews | May 24, 1949 |
| 2,485,743 | Koback | Oct. 25, 1949 |
| 2,544,185 | Sargent | Mar. 6, 1951 |
| 2,576,383 | Avery | Nov. 27, 1951 |
| 2,604,331 | Kingston | July 22, 1952 |